Feb. 3, 1970  L. A. URBAN  3,492,814
FUEL CONTROL
Filed Feb. 13, 1968  3 Sheets-Sheet 1
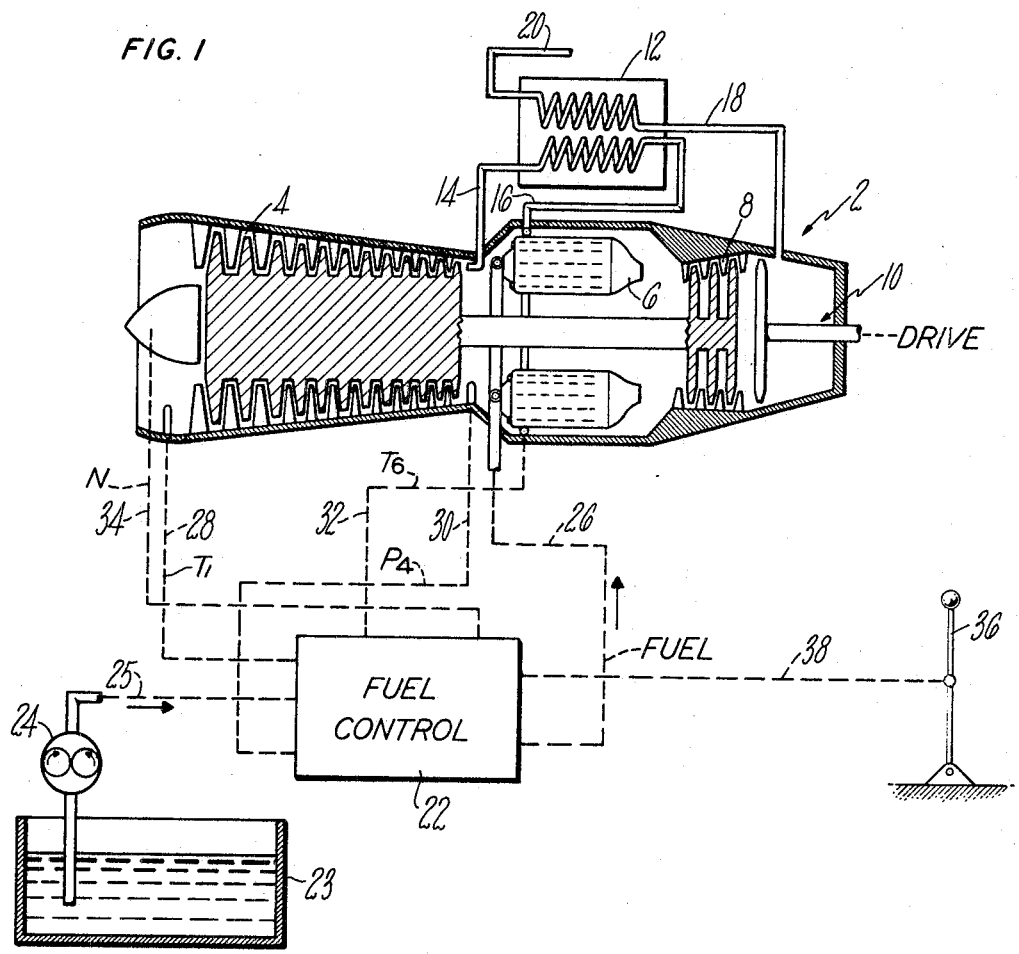
FIG. 1
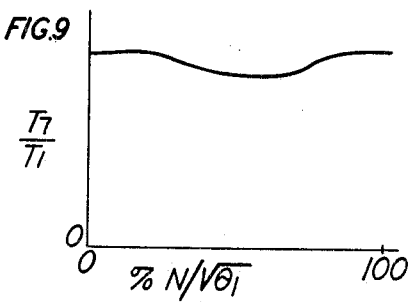
FIG. 9
$\dfrac{T_7}{T_1}$ vs % $N/\sqrt{\theta_1}$
FIG. 10
$\dfrac{Wf}{P_4 \sqrt{T_1}\left(\dfrac{T_7}{T_1}-\dfrac{T_6}{T_1}\right)}$ vs % $N\sqrt{\theta_1}$
INVENTOR
LOUIS A. URBAN
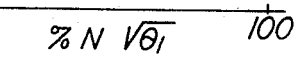
AGENT

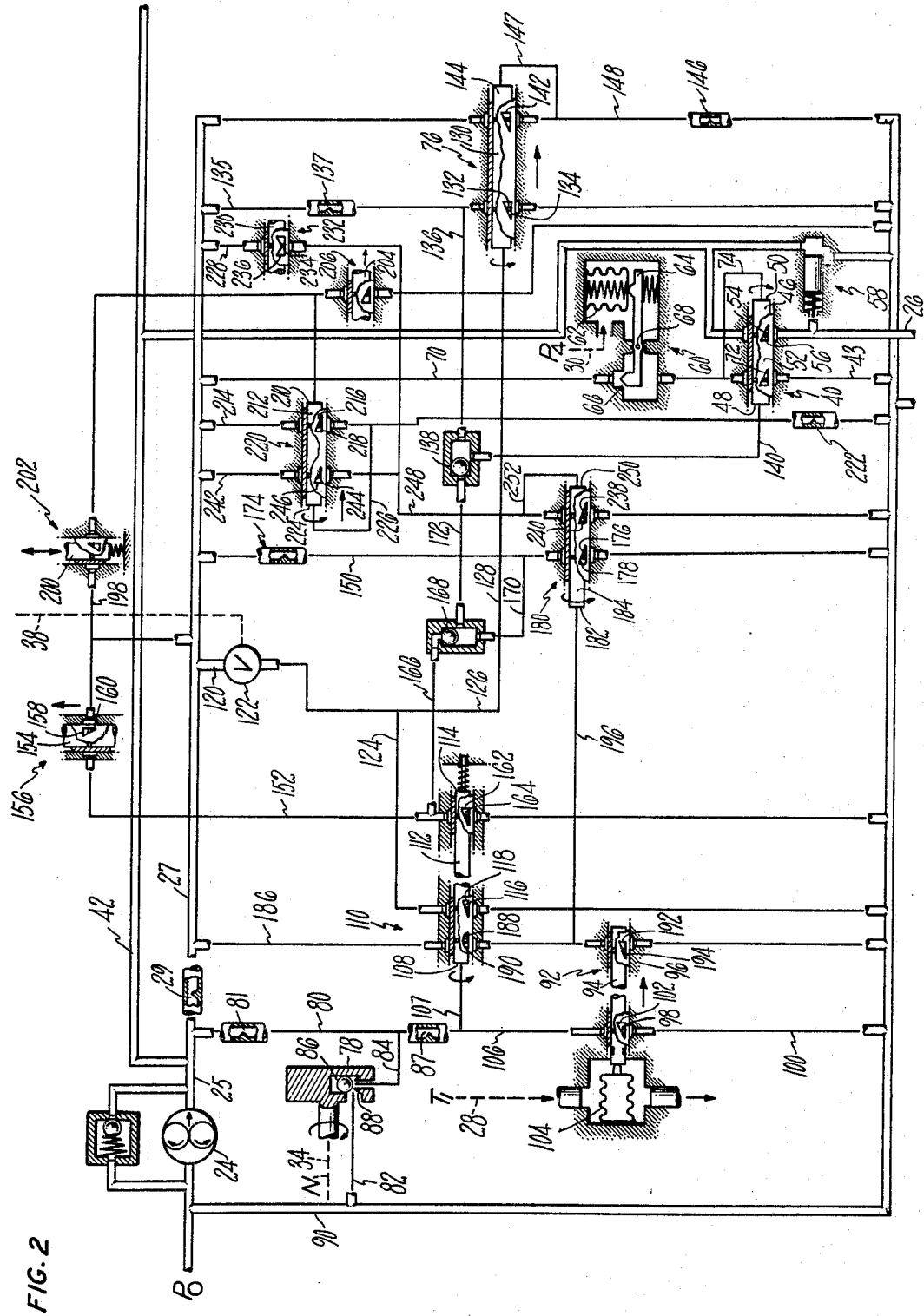

3,492,814
FUEL CONTROL
Louis Andrew Urban, Granby, Conn., assignor to United Aircraft Corporation, East Hartford, Conn., a corporation of Delaware
Filed Feb. 13, 1968, Ser. No. 705,074
Int. Cl. F02c 9/08, 7/10, 3/10
U.S. Cl. 60—39.28                                    8 Claims

ABSTRACT OF THE DISCLOSURE

A fuel control utilizes power plant speed, inlet air temperature, compressor outlet pressure and combustion section inlet temperature as parameters for scheduling the acceleration of the power plant within surge and overtemperature limits.

BACKGROUND OF THE INVENTION

Field of invention

This invention relates to fuel controls and particularly to fuel controls for gas turbine type power plants.

Description of the prior art

In the course of the development of fuel controls for gas turbine engines, many attempts have been made to select parameters which are indicative of the operation of the jet engine in order to control the acceleration and steady state operating modes of the power plant in the most efficient and economical manner. With the use of heretofore known parameters the present day fuel controls are considered complex, requiring a considerable number of components, many of which are expensive to manufacture, assemble and calibrate. The scheduled control parameter which has found extensive use is the one described in Patent No. 2,822,666, granted to S. Best. This patent teaches the type of fuel control that is indicative of the present day state of the art wherein fuel flow to the engine burner is scheduled as a function of $W_f/P$.

A characteristic basic to the $W_f/P$ parameter that accounts for its limited applicability is that in order to limit turbine inlet temperature during acceleration of the engine, the control must generate a schedule signal that assumes that combustor inlet temperature is known as a function of engine speed and engine inlet temperature, and the best known manner of scheduling acceleration has been by the utilization of a three-dimensional cam.

This use of a scheduled $W_f/P$ is not always a valid assumption and is particularly not true of regenerative or recuperative engines during transient operation. This invention relates to an open loop scheduling type control which precisely accounts for the effect of burner inlet temperature on fuel flow required for surge or overtemperature avoidance, and incidentally results in the elimination of the complex three dimensional cam. The theory and operation of the present invention result in a simplified control mechanism and afford other advantages which will be apparent from the description to follow.

SUMMARY OF THE INVENTION

It is an object of this invention to provide an improved fuel control for precisely controlling the acceleration and steady-state operation of a gas turbine type power plant, which utilizes certain power plant conditions as control parameters which have not, heretofore, been used for that purpose.

Another object of the present invention is to provide a fuel control which is readily adaptable for control of turbo jets, turbo-prop jets, and regenerative type jet power plants, either of the solid spool type or the free turbine type.

Another object of the present invention is to provide a fuel control which is adaptable for control of gas turbine type power plants used for propelling aircraft, land-vehicles and ships.

In accordance with the present invention, the above objects are achieved by a fuel control utilizing power plant speed inlet air temperature, compressor outlet pressure, and combustion section (herein also called burner) inlet temperature as parameters for scheduling the acceleration of the power plant within surge and overtemperature limits. The mode of control disclosed herein accounts for the interrelationship between the fuel flow and the above-mentioned significant engine parameters in a theoretically precise manner and thus allows the user to take full advantage of the thermodynamic potential of the engine.

To more fully appreciate the use of these control parameters, it is necessary to understand that surge and turbine inlet temperature can be uniquely related to the above mentioned parameters. These unique relationships are shown in the following discussion in which these symbols are used:

$\Delta H_b$—total heat released in burner, B.t.u./hr.
$W_f$—fuel flow, #/hr.
$\eta b$—combustion heat release efficiency
$qf$—fuel heating value, B.t.u./#
$W_a$—actual air flow, #/sec.
$cp$—specific heat, B.t.u./#-°R
$\Delta Tb$—burner temperature rise, °R
$T_7$—turbine inlet temperature, °R
$T_b$—regenerator cold side outlet (burner inlet) temperature, °R
$P_3/P_1$—engine compressor presure ratio
$P_7/P_8$—gasifier turbine pressure ratio
$K$—various constants
$W_g$—actual gas flow into turbine, #/sec.
$P_7/P_4$—regenerator-burner pressure ratio
$T_1$—engine inlet temperature, °R
$N/\sqrt{\theta_1}$—corrected engine gasifier speed, r.p.m.
$\alpha$—control input lever position $$\theta 1 = \frac{T_1}{520 \cdot R}$$

inlet temperature correction factor

When applied to pressures or temperatures:

subscript 1—engine inlet
subscript 4—regenerator cold side inlet
subscript 6—burner inlet
subscript 7—turbine inlet
subscript 8—turbine outlet The fundamental equation expressing the total heat released in the combustion section of the power plant is:

(1)     $\Delta H_b = W_f \eta_b qf = 3600 W_a C_p \Delta T_b$ which may be rewritten as (2)     $\dfrac{W_f}{W_a} = \dfrac{3600 cp}{\eta b qf} \Delta T_6 = K_1 (T_7 - T_6)$ where $K_1$ is a constant.

The fundamental equation expressing the gasifier turbine inlet flow parameter is:

(3)     $\dfrac{W_g \sqrt{T_7}}{A_7 P_7} = f_1 \dfrac{(P_7)}{(P_8)}$ (see FIG. 3)

Since with very little error $W_g = K_2 W_a$ and $P_7 = P_4 \times P_7/P_4$

Equation 3 may be written as (4) $$W_a = \left[\frac{f_1(P_7/P_8)A_7(P_7/P_4)}{K_2\sqrt{T_7}}\right]P_4$$

Substituting Equation 4 into Equation 2 yields:

(5) $$\frac{W_f}{P_4} = \left[\frac{f_1(P_7/P_8)A_7(P_7/P_4)}{K_2\sqrt{T_7}}\right]K_1(T_7-T_6)$$

which may be written as (6) $$\frac{W_f}{P_4(T_7-T_6)} = \frac{K_3(P_7/P_4)f_1(P_7/P_8)}{\sqrt{T_7}}$$

Since the first turbine pressure ratio ($P_7/P_8$) for any condition is known (for example, during acceleration it depends on compressor pressure ratio, turbine inlet temperature, separation from the steady-state line, and second turbine nozzle position, all of which with negligible consequence error are known as a function of $N/\sqrt{\theta_1}$,) the turbine flow parameter, $f_1(P_7/P_8)$, is known as a function of $N/\sqrt{\theta_1}$ (see FIG. 4). Concomitantly, the regenerator-burner pressure ratio, $P_7/P_4$, is primarily a function of compressor exit mach number, which in turn is a function of $N/\sqrt{\theta_1}$, and compressor pressure ratio; hence, during acceleration $P_7/P_4$ is also known, with negligible consequent error, as a function of $N/\sqrt{\theta_1}$, (see FIG. 5).

For acceleration of the power plant at a constant actual turbine inlet temperature, Equation 6 may be thus written as:

(7) $$\frac{W_f}{P_4(K_4-T_6)} = K_5 f_1(N/\sqrt{\theta_1})$$

To accomplish constant temperature acceleration it thus becomes necessary only to schedule $$\frac{W_f}{P_4(K_4-T_6)}$$

as a unique function of $N/\sqrt{\theta_1}$, and at any particular $N/\sqrt{\theta_1}$, to multiply the scheduled value of the parameter by actual $P_4$ and $(K_4-T_6)$, as calculated from actual measured $T_6$, to arrive at the proper burner fuel flow.

Since the engine surge limit is uniquely defined by $P_3/P_1$ as a function of $N/\sqrt{\theta_1}$, then all other corrected parameters are defined, and to accomplish surge limited acceleration, Equation 6 must be considered in its corrected form:

(8) $$\frac{W_f}{P_4\sqrt{T_1}\left(\frac{T_7}{T_1}-\frac{T_6}{T_1}\right)} = \frac{K_3 P_7/P_4 f(P_7/P_8)}{\sqrt{T_7/T_1}}$$

For acceleration surge limiting, the regenerator-burner pressure ratio (see FIG. 8), the turbine flow parameter (see FIG. 7), and corrected turbine inlet temperature (see FIG. 9) are all precisely known as functions of $N/\sqrt{\theta_1}$ Equation 8 may thus be written as:

(9) $$\frac{W_f}{P_4\sqrt{T_1}\left(\frac{T_7}{T_1}-\frac{T_6}{T_1}\right)} = K_3 f_2(N/\sqrt{\theta_1})$$

Therefore, to accomplish surge limited acceleration it thus becomes necessary only to schedule $$\frac{W_f}{P_4\sqrt{T_1}\left(\frac{T_7}{T_1}-\frac{T_6}{T_1}\right)}$$

as a unique function of $N/\sqrt{\theta_1}$ (see FIG. 10), and at any particular $N/\sqrt{\theta_1}$ to multiply the scheduled value of the parameter by actual $P_4$ actual $\sqrt{T_1}$, and $(T_7/T_1-T_6/T_1)$ as calculated from desired $T_7$ and actual $T_6$ and $T_1$ to arrive at the proper burner fuel flow.

In practice, since in the preferred embodiment orifices are used to accomplish the computations, the need for subtracting orifice areas is avoided by the mathematical expedient of allowing $$(T_7/T_1-T_6/T_1) = (T_7/T_1-a)+(a-T_6/T_1)$$

where $a$ is an arbitrary constant, $(T_7/T_1-a)$ is a unique function of $N/\sqrt{\theta_1}$, and $(a-T_6/T_1)$ is calculated from the actual values of $T_6$ and $T_1$.

To accomplish completely automatic acceleration then, it is necessary to perform the two primary computations (for turbine inlet temperature and surge limiting) and to select the lower of the two computed fuel flows as that which is metered to the burner.

Steady-state speed governing is accomplished through droop control on $Wf/P_4$. Desired speed is set by control input lever position and is compared to actual speed as indicated by $N/\sqrt{\theta_1}$. The resultant speed error determines the position of the droop valve. At such times when the droop valve calls for a lower $Wf/P_4$ than either of the acceleration circuits, the droop valve determines fuel flow to be metered to the engine.

The foregoing and other objects, features and advantages of the present invention will become more apparent in light of the following detailed description of a preferred embodiment thereof, as illustrated in the accompanying drawings.

Description of the drawings

FIG. 1 is a schematic illustration of a regenerative type gas turbine power plane particularly showing the various sensing lines of the fuel control mechanism.

FIG. 2 is a schematic illustration showing a fuel control in accordance with the present invention.

FIG. 9 is a graphical illustration of the relationship between the turbine inlet-engine temperature ratio and corrected engine speed for surge limited acceleration.

FIG. 10 is a graphical illustration of the relationship between the surge limiting acceleration parameter and corrected engine speed.

Description of the preferred embodiment

Figure 3:
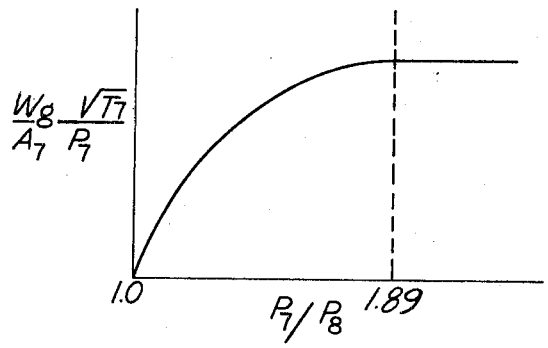
FIG. 3 is a graphical illustration showing the gasifier turbine inlet flow parameter varying as a function of the regenerator-combustor pressure ratio.
Figure 4:
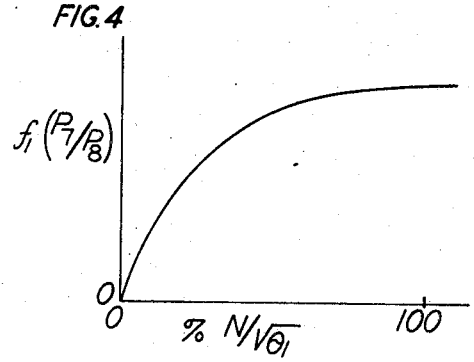
FIG. 4 is a graphical illustration of the relationship between a first function of turbine pressure ratio and corrected engine speed for temperature limited acceleration.
Figure 5:
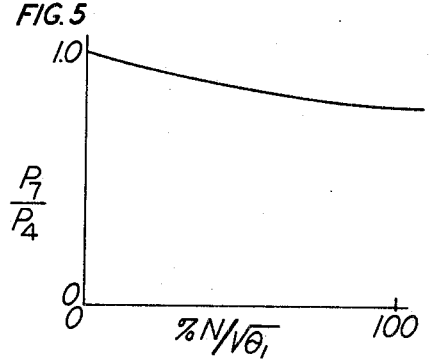
FIG. 5 is a graphical illustration of the relationship between the regenerator-combustor pressure ratio and corrected engine speed for temperature limited acceleration.
Figure 6:
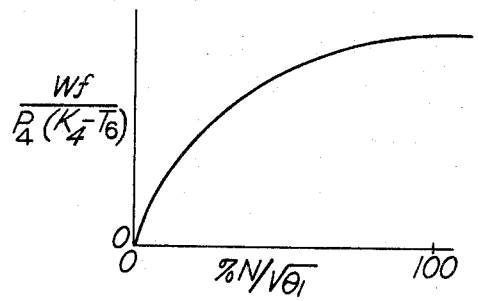
FIG. 6 is a graphical illustration of the relationship between the constant temperature limiting acceleration parameter and corrected engine speed.
Figure 7:
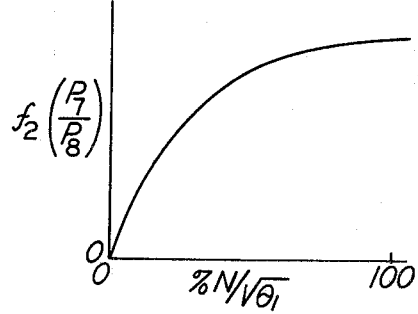
FIG. 7 is a graphical illustration of the relationship between a second function of turbine pressure ratio and corrected engine speed for surge limited acceleration.
Figure 8:
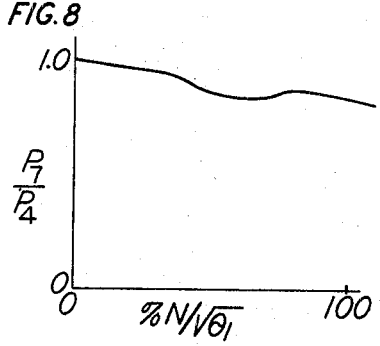
FIG. 8 is a graphical illustration of the relationship between regenerator-combustor pressure ratio and corrected engine speed for surge limited acceleration.

Referring to FIG. 1, there is shown a regenerative type turbine power plant indicated by numeral 2 comprising a compressor section 4, a burner 6, and a turbine section 8 receiving the exhaust gases discharging from the burner 6 for driving the compressor 4 and the power turbine 10. The heat exchanger 12 schematically illustrates a type of regenerative system and serves to place the incoming air to the burner 6 in heat exchange relation with the exhaust gases discharged from the turbine section 8. For this purpose a conduit 14 admits compressor discharge air into the heat exchanger 12 and delivers it to the burner 6 through conduit 16, while conduit 18 admits turbine section exhaust gases into the heat exchanger 12 and discharges them through a conduit 20 to the atmosphere.

The fuel control, generally illustrated by numeral 22, serves to meter fuel from source 23 to the burner 6 through a conduit 26. Pump 24 is provided to pressurize the fuel. As will be more fully illustrated hereinafter, the fuel control 22 receives several signals indicative of the parameters selected to compute the desired amount of fuel necessary to obtain optimum operation. For this purpose the fuel control 22 senses the compressor inlet temperature, as illustrative via sensing line 28, compressor discharge pressure via line 30, burner inlet temperature via line 32, and speed of the power plant via line 34. A power lever 36 is connected, via line 38, to fuel control 22 and is mounted available to the operator, either of an aircraft, a ship, or a land vehicle, as the case may be, and the terminology "power lever" is not particularly limited to a particular lever in the cockpit of an aircraft. Rather it is intended to cover any linkage connecting the control area of the aircraft, ship, or land vehicle to the fuel control whether it be referred to as a "power lever," a "foot pedal," a "throttle lever" or the like. Furthermore, it is to be understood that the use of the regenerative type of turbine engine is shown merely for illustrative purposes, and the illustration is not to be considered a limitation on my invention. As will be obvious to one skilled in the art, this concept is equally applicable to control straight jets, turbo-prop jets, and regenerative-type jet power plants, either of the solid spool type or of the free turbine type. It will be appreciated that my invention is particularly adaptable to a regenerator type of power plant; it is preferable, in that case, to sense the compressor outlet pressure at the inlet to the regenerator 12, and to sense burner inlet temperature at the outlet of the regenerator as shown. In the case of the non-regenerative engine, the control would sense compressor outlet pressure and compressor outlet temperature.

Referring now to FIG. 2, fuel is admitted to throttle valve 40 through conduits 25 and 42 from whence it is metered to the engine via conduit 26. Restricted 29 is a dropping orifice which serves to minimize flow through the computing networks. (It will be understood that like numerals reference like parts in the various drawings). Throttle valve 40 comprises spool 46 having its ends 48 and 50 subjected to metered pressures for positioning the spool in cylinder 52. Metering window 54 in cylinder 52 cooperates with annular groove 56 in spool 46 for establishing the proper area for metering the required amount of fuel to the engine. The maximum travel of spool 46 may be governed by an adjustable stop (not shown) which serves to define the minimum area of window 54 exposed to annular groove 56 for establishing the minimum fuel flow to the engine. It is desirable to maintain the pressure drop across the throttle valve metering window 54 at a constant value. A pressure regulating valve for that purpose is shown schematically and indicated by numeral 58 (a suitable pressure control is shown in greater detail in the 2,822,666 patent supra).

Rotating spool valves 40, 76, 180 and 220 are all positioned by employing the hydraulic wheatstone bridge principle. Any of the particular valves is held in position when the pressures acting on its two ends are in equilibrium. The metered pressure acting on either end is generated intermediate two effective orifice areas connecting the pressure supply line 27 and the drain line 90. The value of the metered pressure in either leg of the bridge depends on the level of the drain pressure and the supply pressure, and on the ratio of the upstream effective area to the downstream effective area. Since the drain pressure and supply pressure are common throughout, the metered pressures on the two ends of any valve will be equal when the effective orifice area ratios of the two legs generating the metered pressures are equal. Positioning of the aforementioned valves is thus seen to be accomplished by matching of effective area ratios in the appropriate computing legs, and is independent of pressure levels or absolute area sizes.

Hydraulic pressure generated intermediate variable orifice 66 indicative of compressor discharge pressure, and variable orifice 72 indicative of actual fuel flow is admitted into cylinder 52 to act on end 50 of spool 46. The area ratio of orifice 72 to orifice 66 is thus indicative of actual $W_f/P_4$. The compressor discharge pressure sensor is generally indicated by the numeral 60 and comprises bellows 62 having its free end suitably connected to lever 64. Pressure through sensing line 30 is admitted to act externally over bellows 62, which is evacuated internally. The force exerted by the bellows 62 on the springs therein and on lever 64 will be indicative of the pressure at the compressor discharge so that the signal produced by movement of lever 64 is proportional to the pressure at the inlet. The free end of lever 64 cooperates with variable orifice 66 by rotating about its pivot 68; the orifice 66 serves to define an area for admitting flow from line 27 into line 70 and to port 72 of throttle valve 40. Line 74 transmits this pressure to end 50 of spool 46. The pressure which is admitted into cylinder 52 to act on end 48 of spool 46 is generated intermediate an effective orifice area pair whose area ratio is indicative of the least amount of fuel flow ratio $W_f/P_4$ called for by the acceleration circuits (turbine inlet temperature limit and surge limit) and the steady-state speed governing (hereinafter droop) circuit, as will be explained hereinafter.

In order to more fully understand this invention the description that will immediately follow will be concerned with that portion of the fuel control 22 which controls the power plant during steady-state operation. Droop control on $W_f/P_4$ is in play at all times when the computed speed error calls for a lower $W_f/P_4$ than either of the two acceleration circuits. Desired power plant speed is set by power lever 36 and is compared to actual speed as indicated by $N/\sqrt{\theta_1}$. The resultant speed error determines the position of the droop valve, generally indicated by numeral 76. At such times when the droop valve 76 calls for a lower $W_f/P_4$ than either of the acceleration circuits, it determines fuel flow rate to be metered to the power plant. Speed is sensed by speed sensor 78 which generates a pressure signal in line 80 which is proportional to the speed of the power plant. This is accomplished by metering high pressure fluid from line 80 into line 82 via line 84. Fluid is metered into line 82 as a function of the position of the flyweight 86 of the speed sensor 78. The greater the speed, the more restricted is orifice 88 due to centrifugal force which forces the flyweight 86 radialy outwardly. As the orifice 88 becomes more restricted, the pressure in line 80, generated by flow from line 25 through orifice 81, increases proportionately to the increase in speed. Fluid issuing from line 82 discharges into drain line 90 and returns to the inlet of pump 24. Valve 92 comprises spool 94 within housing 96 for positioning the groove 98 in the spool 94 for metering flow from line 80 to line 100. The position of groove 98 in spool 94, in cooperation with metering window 102, defines as area which is a function of the temperature sensed in line 28 by virtue of the action of liquid filled bellows 104. Thus, the relationship of the ratio of orifice 87 to the variable restriction formed by groove 98 and metering window 102 serves to create a pressure in line 106, the valve of which is indicative of speed divided by the square root of power plant inlet temperature, i.e., $N/\sqrt{\theta_1}$, which is corrected speed. This pressure is fed, via line 107 to end 108 of valve 110, which is the corrected speed function generator valve, to urge the spool 112 against the spring acting on end 114 of spool 112 for positioning groove 116 relative to metering window 118 to define an area which is indicative of $N/\sqrt{\theta_1}$.

The desired speed is established by varying the orifice size of valve 122 as a function of the power lever setting, through a mechanical connection illustrated by dashed line 38.

High pressure fluid discharged by pump 24 flows to drain line 90 via line 120 by first flowing through a schematically illustrated power lever-positioned valve 122 and spool 112 of valve 110. As described above, the exposed area of window 118 of spool 112 is indicative of actual $N/\sqrt{\theta_1}$ and the area of valve 122 is indicative of desired $N/\sqrt{\theta_1}$. The ratio of these areas is therefore indicative of speed error. Their intermediate pressure is sent to the droop valve 76 via lines 124, 126 and 128, to be balanced by the pressure in line 147. The pressure signal moves the spool 130 of droop valve 76 until the ratio indicative of desired $W_f/P_4$. The pressure signal created in line 136 is transmitted into OR gate valve 138 where the higher pressure value of two signals (although the lower fuel flow value of two signals) is allowed to pass to end 48 of spool 46 of throttle valve 40 via line 140. A signal indicative of actual $W_f/P_4$ is admitted to end 50 of spool 46 via line 70 and orifice 66 as explained above, and when a pressure differential exists across ends 48 and 50 of spool 46, spool 46 will translate, changing the actual fuel flow metered to the engine until actual $W_f/P_4$ as indicated by the ratio of area 72 to area 66 equals the desired $W_f/P_4$ as indicated by the ratio of area 134 to area 137, at which time the valve will be balanced and translation will cease.

The droop schedule is obtained by proper sizing of metering window 142 of valve 76 and of restriction 146 in line 148 so as to obtain a preselected rate of spool 144 translation for a given corrected speed ($N/\sqrt{\theta_1}$ error signal.

The fuel control prevents the compressor from surging and the turbine from encountering an overheat temperature condition during acceleration of the power plant by the mechanism described hereinafter. Surge control is accomplished by valving in line 150 and temperature control is accomplished by valving in line 152; both lines 150 and 152 are connected in parallel to line 136, and all lines have a common supply and drain.

That portion of the control for preventing an overtemperature condition at the turbine inlet by scheduling $W_f$ in accordance with Equation 7, $$\frac{W_f}{P_4(K_4-T_6)} = K_5 f_1(N/\sqrt{\theta_1}$$

is now considered. High pressure fluid discharged by pump 24 flows to drain line 90 after first flowing through spool 154 of valve 156 and through spool 112 of valve 110. Metering window 158, in cooperation with groove 160 in spool 154, defines an area which is a function of the temperature at the inlet to the combustion section $$\left(\frac{K}{K_4-T_6}\right)$$

since valve 156 is made to move directly with $T_6$. Metering window 162 in cooperation with groove 164 in spool 112 of valve 110 defines an area which is indicative of a function of corrected speed $[f_1(N/\sqrt{\theta_1})]$, like metering window 118 and groove 116 do for the droop control as explained heretofore. Thus the ratio of the areas of metering window 162 of valve 112 and metering window 158 of valve 156 is indicative of the desired valve of $W_f/P_4$, which will be matched by the actual $W_f/P_4$ when the throttle valve 40 moves to such a position that the ratio of area 72 to area 66 is the same as the ratio of area 162 to area 158, making the pressure in line 74 the same as the pressure in line 166. The pressure signal in line 166 is fed to OR gate valve 168 which senses the pressure values in lines 166 and 170 and permits the higher pressure of the two to be fed to OR gate valve 138 via line 172.

Now the portion of the fuel control for preventing surge of the compressor by scheduling $W_f$ in accordance with Equation 9, $$\frac{W_f}{P_4\sqrt{T_1}\left(\frac{T_7}{T_1}-\frac{T_6}{T_1}\right)} = K_3 f_2(N/\sqrt{\theta_1}$$

will be described. Fluid discharged by pump 24 flows to drain line 90 via line 150 after first flowing through fixed restriction 174 and groove 176 and metering window 178 in valve 180. A pressure signal intermediate of orifice 190 and orifice 194 acts on end 182 of spool 184 of valve 180. This signal is generated by fluid discharged by pump 24 which flows to drain line 90 via line 186 after first flowing through spool 112 of valve 110 and through spool 94 of valve 92. The area defined by groove 188 and metering window 190 in valve 110 is indicative of the inverse of the function of the corrected speed of the power plant expressed in Equation 9; the area defined by groove 192 and metering window 194 in valve 92 is indicative of the square root of the power plant inlet temperature ($\sqrt{T_1}$); thus, the area ratio of the two areas is indicative of the corrected speed function multiplied by the square root of power plant inlet temperature. The intermediate pressure signal is transmitted to end 182 of spool 184 via line 196 to be balanced in the previously described Wheatstone bridge fashion by the action in concert of areas 240, 244 and 239.

Fluid discharged by pump 24 flows to the drain line 90 via line 198 after flowing through spool 200 of valve 202 and spool 204 of valve 206. Note that valve 202 is part of valve 156 and that valve 206 is part of valve 92. The area of valve 202 is indicative of the combustion section inlet temperature ($T_6$), and the area of valve 206 is indicative of power plant inlet temperature ($T_1$). The relationship of the ratio of the area of valve 202 and the area of valve 206 is indicative of $T_6/T_1$; the intermediate pressure is fed, via line 208, to end 210 of spool 212 for positioning the spool in wheatstone bridge fashion by the action of areas 218 and 222 in concert. Position of spool 212 in valve 220 is thus indicative of the ratio $T_6/T_1$.

Fluid discharged by pump 24 flows to the drain line 90 via line 242 after first flowing through groove 244 in spool 212 and metering window 246 of valve 220. The area defined by groove 244 and metering window 246 is indicative of the expression $$\left(a = \frac{T_6}{T_1}\right)$$

Fluid discharged by pump 24 flows to drain via line 228 after flowing through spool 230 of valve 232 and through spool 184 of valve 180. Note that valve 232 is part of valve 110. The area defined by groove 234 and window 236 of valve 232 is indicative of the relationship $$(T_7/T_1-a)$$

and the area defined by groove 238 and metering window 240 of valve 180 is indicative of $(W_f/P_4)$. As previously stated, fluid discharged by the pump also flows to drain via line 242 after flowing through groove 244 and metering window 246 of valve 220 and through groove 238 and window 240 of valve 180. Lines 228 and 242 join upstream of valve 180, and line 248 connects the junction to valve 180. Thus the ratio of area 240 to the sum of area 246 and area 236 is indicative of the relation $$\frac{W_f/P_4}{(T_7/T_1-a)+(a-T_6/T_1)}$$

since for valve 180 to be in balance the ratio must be the same as the ratio of area 194 to area 190, which was previously shown to be equivalent to the herein stated expression.

The intermediate pressure in line 248 is fed to end 250 of spool 184 via line 252. Thus, it is seen that the spool 184 moves in response to the signals fed to its ends 182 and 250 so that the area defined by groove 176 and metering window 178 is a function of the equation desired.

$$\frac{W_f}{P_4} = \left[\frac{W_f}{P_4\sqrt{T_1}\left(\frac{T_7}{T_1}-\frac{T_6}{T_1}\right)}\right]\sqrt{T_1}\left(\frac{T_7}{T_1}-\frac{T_6}{T_1}\right)$$

The pressure in line 150 between fixed restriction 174 and the area formed by groove 176 and metering window 178, which is indicative of the above relation, is fed to OR gate valve 168 via line 170. OR gate valve 168 selects the higher value of the two pressures in lines 166 and 170. It will be noted that the higher the pressure in either of the two lines, the lower the fuel flow being called for. That is, the pressure in line 166 increases due to a decrease in the area defined by groove 164 and metering window 162 of valve 110; and that area 158 increases with decreasing desired fuel flow due to an increase in the temperature at the combustion section inlet. Likewise, the pressure in line 170 increases when the surge control circuit calls for less fuel flow to the power plant because the area defined by groove 176 and metering window 20 decreases when the desired fuel flow for surge control decreases.

Therefore, the higher pressure selected by OR gate valve 168, which is indicative of the lower fuel flow of the two acceleration circuits, is fed to OR gate valve 138 via line 172 where OR gate valve 138 selects the higher value of the two pressures in lines 172 and 136. In an analogous manner valve 138, in selecting the higher value of the two pressures, is selecting the least fuel flow called for by the acceleration circuits and by the droop control so that the fuel flow metered to the power plant results in the achievement of a desired point of operation during all power plant operating modes.

There has thus been described a preferred embodiment of a fuel control in accordance with the present invention. It should be understood by those skilled in the art that various changes and omissions in the form and detail thereof may be made therein without departing from the spirit and scope of the invention.

What I claim as new and desire to secure by Letters Patent of the United States is:

1. For a turbine type power plant having a compressor, a combustion section, a turbine driven by the exhaust gases of the combustion section for driving the compressor, a source of fuel under pressure, and connection means for interconnecting the source of fuel and the combustion section, a fuel control for delivering fuel to the combustion section, comprising: fuel regulating means disposed in the connection means for regulating the flow of fuel therein for scheduling the acceleration of the power plant said fuel regulating means including controlling means responsive to the speed of the power plant, the compressor inlet temperature, the compressor outlet pressure and the combustion section inlet temperature for regulating said fuel regulating means to prevent the turbine inlet temperature from going above a predetermined limit, and said fuel regulating means also including controlling means responsive to the speed of the power plant, the compressor inlet temperature, the compressor outlet pressure and the combustion section inlet temperature for regulating said fuel regulating means to prevent surge at the compressor.

2. A fuel control for delivering fuel to the combustion section of a turbine type power plant as recited in claim 1, wherein said controlling means comprises:
computing means for limiting the temperature of the gases at the turbine inlet by establishing a scheduled value for satisfying the expression $$\frac{W_f}{P_4(K_4-T_6)}$$

varying as a function of $N/\sqrt{\theta_1}$,
where
$W_f$=fuel flow;
$P_4$=actual compressor outlet pressure;
$K_4$=maximum allowable turbine inlet temperature;
$T_6$=actual combustion section inlet temperature;
$N$=speed of the power plant; and
$\theta_1$=corrected compressor inlet temperature.

3. A fuel control for delivering fuel to the combustion section of a turbine type power plant as recited in claim 1, wherein said controlling means comprises:
computing means for preventing surge at the compressor by establishing a scheduled value for satisfying the expression $$\frac{W_f}{P_4\sqrt{T_1}\left(\frac{T_7}{T_1}-\frac{T_6}{T_1}\right)}$$

varying as a function of $N/\sqrt{\theta_1}$,
where
$W_f$=fuel flow;
$P_4$=actual compressor outlet pressure;
$T_1$=actual compressor inlet temperature;
$T_6$=actual combustion section inlet temperature;
$T_7$=turbine inlet temperature;
$N$=speed of the power plant; and
$\theta_1$=corrected compressor inlet temperature.

4. For a regenerative type gas turbine engine having a compressor, a combustion section, a turbine driven by the exhaust gases of the combustion section for driving the compressor, a regenerator for recovering heat from the exhaust gases of the turbine and transferring the heat to the compressor exhaust gases prior to the entry of the gases into the combustion section, a source of fuel under pressure and connection means for interconnecting the source of fuel and the combustion section, a fuel control for delivery of fuel to the combustion section, comprising:
fuel regulating means disposed in the connection means for regulating the flow of fuel therein; and
controlling means responsive to power plant speed, compressor inlet temperature, regenerator inlet pressure, and combustion section inlet temperature for controlling said fuel regulating means including first computing means for limiting the temperature of the gases at the turbine inlet by establishing a scheduled value for satisfying a first expression $$\frac{W_f}{P_4(K_4-T_6)}$$

varying as a function of $N/\sqrt{\theta_1}$,
where
$W_f$=fuel flow;
$P_4$=actual compressor discharge or regenerator inlet pressure;
$K_4$=maximum allowable turbine inlet temperature;
$T_6$=actual combustion section inlet temperature;
$N$=speed of the power plant; and
$\theta_1$=corrected compressor inlet temperature.

5. A fuel control as recited in claim 4, additionally comprising:
second computing means within said controlling means for preventing surge at the compressor by establishing a scheduled value for satisfying a second expression $$\frac{W_f}{P_4\sqrt{T_1}\left(\frac{T_6}{T_1}-\frac{T_6}{T_1}\right)}$$

varying as a function of $N/\sqrt{\theta_1}$,
where
$T_1$=compressor inlet temperature; and
$T_7$=turbine inlet temperature.

6. A fuel control as recited in claim 5, additionally comprising: third computing means within said controlling means for comparing the fuel flows called for by said first and said second expressions, selecting the lower of the fuel flows, and controlling said fuel regulating means so that the lower of the fuel flows is delivered to the combustion section.

7. A fuel control as recited in claim 1, additionally comprising:
first computing means within said controlling means for limiting the temperature of the gases at the turbine inlet by establishing a scheduled value for satisfying a first expression $$\frac{W_f}{P_4(K_4-T_6)}$$

varying as a function of $N/\sqrt{\theta_1}$,
where
$W_f$ = fuel flow;
$P_4$ = actual compressor outlet pressure;
$K_4$ = maximum allowable turbine inlet temperature;
$N$ = speed of the power plant;
$\theta_1$ = corrected compressor inlet temperature; and
$T_6$ = actual combustion section inlet temperature;
second computing means within said controlling means for preventing surge at the compressor by establishing a scheduled value for satisfying a second expression $$\frac{W_f}{P_4\sqrt{T_1}\left(\frac{T_7}{T_1}-\frac{T_6}{T_1}\right)}$$

varying as a function of $N/\sqrt{\theta_1}$,
where
$T_1$ = actual compressor inlet temperature; and
$T_7$ = turbine inlet temperature; and
third computing means within said controlling means for comparing the fuel flows called for by said first expression and said second expression, selecting the lower of the fuel flows, and controlling said fuel regulating means so that the lower of the fuel flows is delivered to the combustion section.

8. For a turbine type power plant having a compressor, a combustion section, a turbine driven by the exhaust gases of the combustion section for driving the compressor, a power lever, a source of fuel under pressure and connection means for interconnecting the source of fuel and the combustion section, a fuel control for scheduling the steady-state and acceleration operation of the power plant comprising: fuel regulating means disposed in the connection means and movable therein for regulating the flow of fuel therethrough; said fuel regulating means being moveable in response to power plant speed, compressor discharge pressure, and power lever setting during steady-state operation, and moveable in response to power plant speed, compressor inlet temperature, compressor discharge pressure and combustion section inlet temperature during acceleration of the power plant to prevent the turbine inlet temperature from going above a predetermined limit, and moveable in response to power plant speed, compressor discharge pressure, compressor inlet temperature and combustion section inlet temperature during acceleration of the power plant to prevent surge at the compressor.

References Cited

UNITED STATES PATENTS

| | | | |
|---|---|---|---|
| 2,822,666 | 2/1958 | Best | 60—39.28 |
| 2,939,280 | 6/1960 | Farkas. | |
| 2,971,339 | 4/1961 | Gold et al. | |
| 3,342,031 | 9/1967 | Bevers | 60—39.28 |
| 3,348,375 | 10/1967 | Gardner et al. | 60—39.2R |
| 3,377,848 | 4/1968 | Marvin | 60—39.28 X |

AL LAWRENCE SMITH, Primary Examiner

U.S. Cl. X.R.

60—39.51

UNITED STATES PATENT OFFICE
CERTIFICATE OF CORRECTION

Patent No. 3,492,814          Dated February 3, 1970

Inventor(s) Louis A. Urban

It is certified that error appears in the above-identified patent and that said Letters Patent are hereby corrected as shown below:

Column 10, lines 59 and 60, the portion of the formula reading $$\left(\frac{T_6}{T_1} - \frac{T_6}{T_1}\right)$$ should read $$\left(\frac{T_7}{T_1} - \frac{T_6}{T_1}\right)$$

SIGNED AND SEALED
AUG 25 1970

(SEAL)
Attest:

Edward M. Fletcher, Jr.
Attesting Officer

WILLIAM E. SCHUYLER, JR.
Commissioner of Patents